United States Patent
Zheng et al.

(10) Patent No.: US 12,179,186 B2
(45) Date of Patent: Dec. 31, 2024

(54) LAYERED CATALYSTS COMPOSITION AND CATALYTIC ARTICLE AND METHODS OF MANUFACTURING AND USING THE SAME

(71) Applicant: BASF MOBILE EMISSIONS CATALYSTS LLC, Iselin, NJ (US)

(72) Inventors: Xiaolai Zheng, Iselin, NJ (US); Michel Deeba, East Brunswick, NJ (US); Dinh Dang, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 544 days.

(21) Appl. No.: 17/309,746

(22) PCT Filed: Dec. 16, 2019

(86) PCT No.: PCT/IB2019/060849
§ 371 (c)(1),
(2) Date: Jun. 17, 2021

(87) PCT Pub. No.: WO2020/128786
PCT Pub. Date: Jun. 25, 2020

(65) Prior Publication Data
US 2022/0001370 A1    Jan. 6, 2022

Related U.S. Application Data

(60) Provisional application No. 62/781,629, filed on Dec. 19, 2018.

(30) Foreign Application Priority Data

Jan. 18, 2019 (EP) .................................. 19152494

(51) Int. Cl.
*B01J 21/06* (2006.01)
*B01J 21/04* (2006.01)
(Continued)

(52) U.S. Cl.
CPC ............... *B01J 35/19* (2024.01); *B01J 21/04* (2013.01); *B01J 23/63* (2013.01); *B01J 23/83* (2013.01);
(Continued)

(58) Field of Classification Search
CPC . B01J 21/04; B01J 21/063; B01J 23/02; B01J 23/10; B01J 23/42; B01J 23/44;
(Continued)

(56) References Cited

U.S. PATENT DOCUMENTS 4,931,419 A * 6/1990 Blanchard ............ B01D 53/945
502/325
4,985,387 A * 1/1991 Prigent .................... B01J 23/10
502/302

(Continued)

FOREIGN PATENT DOCUMENTS

EP    443765 A1    2/1991
EP    885657 A2    12/1998

(Continued)

OTHER PUBLICATIONS

European Search Report for EP Patent Application No. 19898403.1, Issued on Sep. 22, 2022, 4 pages.

(Continued)

*Primary Examiner* — Cam N. Nguyen
(74) *Attorney, Agent, or Firm* — DLA Piper LLP (US)

(57) ABSTRACT

The presently claimed invention provides a layered catalytic article comprising a first layer comprising a nickel component and a ceria component, wherein the amount of the nickel component is 1.0 to 50 wt. %, calculated as nickel oxide, based on the total weight of the first layer, and wherein the first layer is essentially free of copper; a second layer comprising a platinum group metal component, an oxygen storage component, and an alumina component, (Continued)

| PGM, OSC, Al₂O₃ |
| Ni(NiO), CeO₂ |
| Substrate |

| Ni(NiO), CeO₂ |
| PGM, OSC, Al₂O₃ |
| Substrate | wherein the platinum group metal component comprises platinum, rhodium, palladium, or any combination thereof, and wherein the amount of the platinum group metal component is 0.0 to 5 wt. %, based on the total weight of the second layer; and a substrate. The presently claimed invention also provides a process for preparing the layered catalytic article. It further provides an exhaust system for internal combustion engines comprising a layered catalytic article.

20 Claims, 4 Drawing Sheets

(51) Int. Cl.
| | |
|---|---|
| B01J 23/02 | (2006.01) |
| B01J 23/10 | (2006.01) |
| B01J 23/44 | (2006.01) |
| B01J 23/46 | (2006.01) |
| B01J 23/58 | (2006.01) |
| B01J 23/63 | (2006.01) |
| B01J 23/755 | (2006.01) |
| B01J 23/78 | (2006.01) |
| B01J 23/83 | (2006.01) |
| B01J 23/89 | (2006.01) |
| B01J 35/00 | (2006.01) |
| B01J 35/10 | (2006.01) |
| B01J 35/56 | (2024.01) |
| B01J 37/02 | (2006.01) |
| F01N 3/10 | (2006.01) |
| F01N 3/28 | (2006.01) |

(52) U.S. Cl.
CPC .......... B01J 35/56 (2024.01); B01J 37/0244 (2013.01); B01J 37/0248 (2013.01); F01N 3/101 (2013.01); F01N 3/2807 (2013.01); F01N 2370/02 (2013.01); F01N 2510/0684 (2013.01)

(58) Field of Classification Search
CPC . B01J 23/464; B01J 23/58; B01J 23/63; B01J 23/755; B01J 23/78; B01J 23/83; B01J 23/892; B01J 23/894; B01J 35/19; B01J 37/0244; F01N 3/101
See application file for complete search history.

(56) References Cited

U.S. PATENT DOCUMENTS

| | | | | |
|---|---|---|---|---|
| 5,015,617 A * | 5/1991 | Ohata | ............ | B01D 53/945 502/349 |
| 5,057,483 A * | 10/1991 | Wan | ............ | B01J 23/894 423/213.5 |
| 5,254,519 A * | 10/1993 | Wan | ............ | B01J 37/0244 502/252 |
| 5,258,340 A * | 11/1993 | Augustine | ............ | B01D 53/864 502/313 |
| 5,580,535 A * | 12/1996 | Hoke | ............ | F24C 15/205 502/332 |
| 5,597,771 A * | 1/1997 | Hu | ............ | F01N 3/10 502/333 |
| 5,908,800 A * | 6/1999 | Bonneau | ............ | B01J 23/10 501/103 |
| 5,948,723 A * | 9/1999 | Sung | ............ | B01J 35/19 502/340 |
| 6,087,298 A * | 7/2000 | Sung | ............ | B01J 35/19 502/328 |
| 6,375,910 B1 * | 4/2002 | Deeba | ............ | F01N 3/0814 502/340 |
| 6,777,370 B2 * | 8/2004 | Chen | ............ | B01J 23/58 502/328 |
| 7,517,510 B2 * | 4/2009 | Chen | ............ | B01J 37/0244 422/177 |
| 7,550,124 B2 * | 6/2009 | Chen | ............ | F01N 13/0097 422/177 |
| 7,749,472 B2 * | 7/2010 | Chen | ............ | B01D 53/945 502/527.12 |
| 7,754,171 B2 * | 7/2010 | Chen | ............ | B01J 37/0244 60/302 |
| 7,758,834 B2 | 7/2010 | Chen et al. | | |
| 7,879,755 B2 * | 2/2011 | Wassermann | ........ | B01J 37/0248 502/328 |
| 7,981,390 B2 * | 7/2011 | Galligan | ............ | B01J 23/63 502/514 |
| 8,038,951 B2 * | 10/2011 | Wassermann | ............ | B01J 23/44 60/302 |
| 8,545,780 B1 * | 10/2013 | Chen | ............ | B01J 35/56 502/328 |
| 8,603,423 B2 * | 12/2013 | Andersen | ............ | B01J 29/7415 502/60 |
| 8,637,426 B2 * | 1/2014 | Hoke | ............ | F01N 3/103 502/333 |
| 8,679,434 B1 * | 3/2014 | Li | ............ | B01J 35/56 60/299 |
| 8,828,343 B2 * | 9/2014 | Liu | ............ | B01J 35/19 502/262 |
| 8,833,064 B2 * | 9/2014 | Galligan | ............ | B01J 21/066 502/262 |
| 8,835,346 B2 * | 9/2014 | Gramiccioni | ........ | B01J 37/0242 502/340 |
| 8,906,330 B2 * | 12/2014 | Hilgendorff | ............ | B01J 23/40 502/262 |
| 8,950,174 B2 * | 2/2015 | Hilgendorff | ......... | B01D 53/945 60/299 |
| 11,130,117 B2 * | 9/2021 | Gu | ............ | B01J 23/63 |
| 2001/0036432 A1 * | 11/2001 | Hu | ............ | F01N 13/009 502/328 |
| 2002/0048542 A1 * | 4/2002 | Deeba | ............ | F01N 3/0814 502/328 |
| 2002/0131915 A1 * | 9/2002 | Shore | ............ | C01B 3/583 422/177 |
| 2003/0165414 A1 * | 9/2003 | Galligan | ............ | B01D 53/94 423/213.2 |
| 2008/0044330 A1 * | 2/2008 | Chen | ............ | B01J 37/0248 502/333 |
| 2009/0257933 A1 | 10/2009 | Chen et al. | | |
| 2009/0266063 A1 | 10/2009 | Gandhi et al. | | |
| 2010/0215557 A1 * | 8/2010 | Liu | ............ | B01J 37/0248 502/333 |
| 2011/0020201 A1 | 1/2011 | Luo et al. | | |
| 2012/0055141 A1 * | 3/2012 | Hilgendorff | ......... | B01J 37/0203 502/328 |
| 2013/0202508 A1 | 8/2013 | Hepburn et al. | | |
| 2014/0106260 A1 * | 4/2014 | Cargnello | ............ | B01J 21/066 502/262 |
| 2014/0271429 A1 * | 9/2014 | Kazi | ............ | B01J 23/58 502/328 |
| 2014/0322114 A1 | 10/2014 | Jen et al. | | |
| 2015/0266014 A1 * | 9/2015 | Xue | ............ | B01J 35/19 502/328 |
| 2015/0298098 A1 * | 10/2015 | Gramiccioni | ........ | B01D 53/945 427/430.1 |
| 2016/0158699 A1 | 6/2016 | Cavataio et al. | | |
| 2018/0229224 A1 | 8/2018 | Zheng et al. | | |
| 2019/0126247 A1 * | 5/2019 | Deeba | ............ | B01J 23/63 |
| 2019/0160427 A1 * | 5/2019 | Deeba | ............ | B01J 23/10 |
| 2020/0347763 A1 * | 11/2020 | Liu | ............ | F01N 3/2807 |
| 2021/0283580 A1 * | 9/2021 | Zheng | ............ | B01D 53/9422 |
| 2022/0025796 A1 * | 1/2022 | Vjunov | ............ | B01J 37/0242 |

FOREIGN PATENT DOCUMENTS

| | | |
|---|---|---|
| EP | 2308595 B1 | 4/2019 |
| WO | WO1992005861 A1 | 4/1992 |

(56) References Cited

FOREIGN PATENT DOCUMENTS

| WO | WO 1999056859 A1 | 11/1999 |
| WO | WO 2008022160 | 2/2008 |
| WO | WO-2015/187664 A1 | 12/2015 |

OTHER PUBLICATIONS

International Search Report dated May 4, 2020, PCT/IB2019/060849.
European Search Report for EP Patent Application No. 19152494.1, Issued on Jul. 2, 2019, 3 pages.
Heck, et al., "Chapter 2—The Preparation of Catalytic Materials: Carriers, Active, Components, and Monolithic Substrates", Catalytic Air Pollution Control: Commercial Technology, 2nd Edition, 2002, pp. 18-19.

\* cited by examiner

| PGM, OSC, Al$_2$O$_3$ |
|---|
| Ni(NiO), CeO$_2$ |
| Substrate |

| Ni(NiO), CeO$_2$ |
|---|
| PGM, OSC, Al$_2$O$_3$ |
| Substrate |

FIGURE 1

LAYERED CATALYSTS COMPOSITION AND CATALYTIC ARTICLE AND METHODS OF MANUFACTURING AND USING THE SAME

This application is a national stage filing under 35 U.S.C. § 371 of International Application No. PCT/IB2019/060849, filed on Dec. 16, 2019, which claims priority to U.S. Provisional Application No. 62/781,629, filed on Dec. 19, 2018 and European Application No. 19152494.1, filed on Jan. 18, 2019, the content of each application is incorporated herein by reference in its entirety.

FIELD OF THE DISCLOSURE

The presently claimed invention relates to a layered catalyst composition and a layered catalytic article useful for the treatment of the exhaust gases to reduce pollutants contained therein. Particularly, the presently claimed invention relates to the layered catalyst composition and the layered catalytic article comprising a platinum group metal and a non-platinum group metal.

BACKGROUND

Various catalysts and catalyst systems are known for the treatment of engine exhaust gases which typically contain pollutants such as hydrocarbons (HC), carbon monoxide (CO), and nitrogen oxides (NOx). These pollutants are required to be substantially removed from the exhaust gases to meet strict government regulations. Three-way conversion (TWC) catalysts are commonly utilized for treating the exhaust gases emitted from gasoline-powered vehicles. The TWC catalysts and the relevant systems are based on platinum group metals (PGM) such as platinum, palladium, and rhodium. The platinum group metal-based TWC catalysts are well known to reduce the pollutants from a gasoline engine effectively. However, as the platinum group metals are expensive, there is a demand for making TWC catalysts and systems with reduced usage of PGM.

In order to meet such a demand, various attempts have been made in the past which include at least partially replacing PGM with other metals such as base metals which are much cheaper and are available in large quantities. However, these catalysts and systems suffer with one or more drawbacks which include, but are not limited to, lack of desired efficiency for oxidizing HC and CO and reducing NOx, low thermal stability and the like. Thus, these catalysts still utilize a high amount of PGM to achieve the desired efficiency, thereby unable to reduce the overall cost.

Further, it is also found that in some catalysts or systems, the addition of select base metals to the catalysts resulted in poisoning of PGM and led to less catalytic efficiency.

Therefore, there is still need for a catalyst composition and/or a catalytic article which can significantly reduce the utilization of PGM, thereby making it cost-effective yet highly efficient for the removal of HC, CO and NOx compounds from mobile emission sources in order to meet increasingly stringent regulations.

SUMMARY OF THE DISCLOSURE

Accordingly, the presently claimed invention is focused on providing a catalyst composition comprising a combination of platinum group metal(s) and non-platinum group metal(s) in order to reduce the utilization of platinum group metals but achieve the desired or improved emission control functionality.

In one aspect, the presently claimed invention provides a layered catalytic article comprising:
a) a first layer comprising a nickel component supported on a ceria component, wherein the amount of the nickel component is 1.0 to 50 wt. %, calculated as nickel oxide, based on the total weight of the first layer, and wherein the first layer is essentially free of copper, wherein the amount of copper is <0.001 wt. %;
b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate.

In still another aspect, the presently claimed invention provides a process for the preparation of a layered catalytic article, wherein said process comprises preparing a bottom layer slurry; depositing the bottom layer slurry on a substrate to obtain a bottom layer; preparing a top layer slurry; and depositing the top layer slurry on the bottom layer to obtain a top layer followed by calcination at a temperature ranging from 400 to 700° C. Typically, the step of preparing the bottom layer slurry or top layer slurry comprises a technique selected from incipient wetness impregnation, incipient wetness co-impregnation, and post-addition.

In still another aspect, the presently claimed invention provides an exhaust system for internal combustion engines, said system comprising a layered catalytic article.

In another aspect, the presently claimed invention provides a method of reducing hydrocarbons, carbon monoxide, and nitrogen oxide levels in a gaseous exhaust stream, the method comprising contacting the gaseous exhaust stream with the catalytic article or the exhaust system according to the presently claimed invention to reduce the levels of hydrocarbons, carbon monoxide, and nitrogen oxide in the exhaust gas.

In another aspect, the presently claimed invention provides use of the catalytic article for purifying a gaseous exhaust stream comprising hydrocarbons, carbon monoxide, and nitrogen oxide.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

FIG. 1 is a schematic representation of catalytic article designs in exemplary layered configurations according to different embodiments of the invention.

DETAILED DESCRIPTION OF THE DISCLOSURE

Figure 2A:
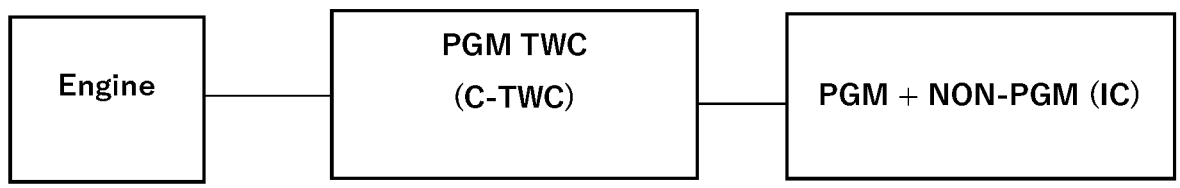
FIG. 2A is a schematic representation of an exhaust system in accordance with one embodiment of the presently claimed invention.

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

As used herein, the term "catalyst" or "catalyst composition" refers to a material that promotes a reaction.

The term "NOx" refers to nitrogen oxide compounds, such as NO and/or $NO_2$.

As used herein, "non-PGM metals" refers to active metals or metal oxides which include, but are not limited to, Ni, Fe, Mn, Zn and any mixture thereof.

As used herein the term "essentially free of copper" refers to no external addition of copper or copper oxide in the first layer, however it may optionally present as a fractional amount <0.001%. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein.

"BET surface area" has its usual meaning of referring to the Brunauer-Emmett-Teller method for determining surface area by $N_2$-adsorption measurements. Unless otherwise specifically stated, all references herein to the "specific surface area" or "surface area" refers to the BET surface area.

The platinum group metal (PGM) component refers to any component that includes a PGM (Rh, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," and the like refer to the respective platinum group metal compound, complex, or the like which, upon calcination or use of the catalyst, decomposes or otherwise converts to a catalytically active form, usually the metal or the metal oxide.

The term "catalytic article" or "catalyst article" refers to a component in which a substrate is coated with catalyst composition which is used to promote a desired reaction. The term layered catalytic article refers to a catalytic article in which a substrate is coated with a PGM and/or non-PGM composition(s) in a layered fashion. These composition(s) may be referred as washcoat(s).

As used herein, "impregnated" or "impregnation" refers to permeation of the catalytic material into the porous structure of the support material.

A "support" in a catalytic material or catalyst composition or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below.

"Refractory metal oxide supports" are metal oxides including, for example, bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina.

Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia alumina, and alumina-ceria. Exemplary alumina includes large pore boehmite, gamma-alumina, and delta/theta alumina. Useful commercial alumina used as a starting material in exemplary processes include activated alumina(s), such as high bulk density gamma-alumina, low or medium bulk density large pore gamma-alumina, and low bulk density large pore boehmite and gamma-alumina. Such materials are generally considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 300 $m^2/g$ or higher. Such activated alumina is usually a mixture of the gamma and delta phases of alumina, but may also contain substantial amounts of eta, kappa and theta alumina phases.

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include ceria composites optionally doped with early transition metal oxides, particularly zirconia, lanthana, praseodymia, neodymia, niobia, europia, samaria, ytterbia, yttria, and mixtures thereof.

The presently claimed invention provides a layered catalytic article comprising a) a first layer comprising a nickel component supported on a ceria component, wherein the amount of the nickel component is 1.0 to 50 wt. %, calculated as nickel oxide, based on the total weight of the first layer, and wherein the first layer is essentially free of copper wherein the amount of copper is <0.001 wt. %; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate. In another embodiment the amount of the platinum group metal component is 0.02 to 1.0 wt. %, based on the total weight of the second layer. In another embodiment the amount of the platinum group metal component is 0.02 to 0.1 wt. %, based on the total weight of the second layer. In one embodiment, the platinum group metal component comprises palladium and rhodium, wherein the ratio of palladium to rhodium is in the range of 100:1 to 1:5. In another embodiment, the platinum group metal component comprises platinum and rhodium, wherein the ratio of platinum to rhodium is in the range of 100:1 to 1:5. In still another embodiment, the platinum group metal component is rhodium and the amount of rhodium is 0.02 to 1.0 wt. %, based on the total weight of the second layer.

The catalyst composition takes advantage of high efficiency of precious metals such as PGM and low cost of non-PGM metals such as base metals. The combination of both precious metals and non-PGM catalyst components work effectively and co-ordinately for efficient CO, NOx and HC conversions and reduction of the pollutants contained in the exhaust gas stream.

In one embodiment, the layered catalytic article comprises a) a first layer comprising a nickel component supported on a ceria component, wherein the amount of the nickel component is 10 to 40 wt. %, calculated as nickel oxide, based on the total weight of the first layer, and wherein the first layer is essentially free of copper; b) a second layer comprising a platinum group metal component supported on an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate.

In another embodiment, the layered catalytic article comprises a) a first layer comprising a nickel component supported on a ceria component, wherein the amount of the nickel component is 10 to 40 wt. %, calculated as nickel oxide, based on the total weight of the first layer, and wherein the first layer is essentially free of copper; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.02 to 1.0 wt. %, based on the total weight of the second layer; and c) a substrate, wherein the first or the second layer is deposited as a top layer or bottom layer on a substrate.

In another embodiment, the layered catalytic article comprises a) a first layer comprising a nickel component supported on a ceria component, wherein the amount of the nickel component is 10 to 40 wt. %, calculated as nickel oxide, based on the total weight of the first layer, and wherein the first layer is essentially free of copper; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.02 to 0.1 wt. %, based on the total weight of the second layer; and c) a substrate, wherein the first or the second layer is deposited as a top layer or bottom layer on a substrate.

In one embodiment, the layered catalytic article comprises a) a first layer comprising a nickel component supported on a ceria component comprising ceria having a specific surface area in the range of 15 $m^2/g$ to 60 $m^2/g$ after calcination at 950° C. for 12 hours in the air, wherein the amount of the nickel component is 1.0 to 50 wt. %, calculated as nickel oxide, based on the total weight of the first layer, wherein the amount of ceria component is 20 to 80 wt. %, based on the total weight of the first layer and wherein the first layer is essentially free of copper; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate.

In one embodiment, the ceria component of the first layer comprises a dopant. The examples of dopants include, but are not limited to, zirconia, yttria, praseodymia, lanthana, neodymia, samaria, gadolinia, alumina, titania, baria, strontia, and combinations thereof. The dopant is used in an amount of 1.0 to 20 wt. %, based on the total weight of the ceria component. In one embodiment, the layered catalytic article comprises a) a first layer comprising a nickel component supported on a ceria component comprising ceria having a specific surface area in the range of 15 $m^2/g$ to 60 $m^2/g$ after calcination at 950° C. for 12 hours in the air and a dopant selected from zirconia, yttria, praseodymia, lanthana, neodymia, samaria, gadolinia, alumina, titania, baria, strontia, and combinations thereof, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component and wherein the first layer is essentially free of copper; b) a second layer comprising a platinum group metal component supported on an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the second layer; and c)

a substrate, wherein the first or the second layer is deposited as a top layer or bottom layer on a substrate.

In one embodiment, the layered catalytic article comprises a) a first layer comprising i) a nickel component supported on a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and ii) a transition metal selected from manganese, iron, zinc, and combinations thereof, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the transition metal is 1.0 to 10 wt. %, calculated as the corresponding transition metal oxide, based on the total weight of the first layer and wherein the first layer is essentially free of copper; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate.

In one embodiment, the layered catalytic article comprises a) a first layer comprising i) a nickel component supported on a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and ii) iron, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the iron is 1.0 to 10 wt. %, calculated as iron oxide, based on the total weight of the first layer and wherein the first layer is essentially free of copper; b) a second layer comprising a platinum group metal component supported on an oxygen storage component and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate.

In still another embodiment, the first layer comprises a transition metal other than nickel. The transitional metal used includes, but is not limited to, manganese, iron, zinc, and combinations thereof. In one embodiment, the amount of the transition metal used is 1.0 to 10 wt. %, calculated as the corresponding transition metal oxide, based on the total weight of the first layer. In one embodiment, the transition metal is iron, which is used in an amount of 1.0 to 10 wt. %, calculated as iron oxide, based on the total weight of the first layer. In one embodiment, the layered catalytic article comprises a) a first layer comprising i) a nickel component supported on a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and ii) optionally, a transition metal selected from manganese, iron, zinc, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the transitional metal is 1.0 to 10 wt. %, calculated as the corresponding transition metal oxide, based on the total weight of the first layer and wherein the first layer is essentially free of copper; b) a second layer comprising i) a platinum group metal component supported on an oxygen storage component and an alumina component, and ii) at least one alkaline earth metal oxide comprising barium oxide, strontium oxide, or any combination thereof, wherein the platinum group metal component comprises platinum, rhodium, palladium, or any combination thereof, wherein the amount of the platinum group metal component is 0.01 to 5 wt. %, based on the total weight of the second layer, and the amount of the alkaline earth metal oxide is 1.0 to 20 wt. %, based on the total weight of the second layer; and c) a substrate, wherein the first or the second layer is deposited as a top layer or bottom layer on a substrate.

In one embodiment, the layered catalytic article comprises a) a first layer comprising i) a nickel component supported on a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and ii) optionally, a transition metal selected from manganese, iron, zinc, and combinations thereof, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the transition metal is 1.0 to 10 wt. %, calculated as the corresponding transition metal oxide, based on the total weight of the first layer, wherein the amount of the alkaline earth metal oxide is 1.0 to 20 wt. %, based on the total weight of the first layer and wherein the first layer is essentially free of copper; b) a second layer comprising i) rhodium in an amount of 0.02 to 1.0 wt. %, based on the total weight of the second layer supported on an oxygen storage component and an alumina component and ii) optionally, at least one alkaline earth metal oxide comprising barium oxide, strontium oxide, or any combination thereof; and c) a substrate, wherein the first or the second layer is deposited as a top layer or bottom layer on a substrate.

In one embodiment, the layered catalytic article comprises a) a first layer comprising i) a nickel component, ii) a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and iii) optionally, a transition metal selected from manganese, iron, zinc, and combinations thereof, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the transition metal is 1.0 to 10 wt. %, calculated as the corresponding transition metal oxide, based on the total weight of the first layer and wherein the first layer is essentially free of copper; b) a second layer comprising i) palladium and rhodium, wherein the ratio of palladium or platinum to rhodium is in the range of 100:1 to 1:5, ii) an oxygen storage component, iii) an alumina component and iv) optionally, at least one alkaline earth metal oxide comprising barium oxide, strontium oxide, or any combination thereof; and c) a substrate, wherein the first or the second layer is deposited as a top layer or bottom layer on a substrate.

In one embodiment, the layered catalytic article comprises a) a first layer comprising i) a nickel component supported on a ceria component comprising ceria having a specific surface area in the range of 15 m$^2$/g to 60 m$^2$/g after calcination at 950° C. for 12 hours in the air and optionally, a dopant selected from zirconia, yttria, praseodymia, lanthana, neodymia, samaria, gadolinia, alumina, titania, baria, strontia, and combinations thereof, and ii) optionally, a transition metal selected from manganese, iron, zinc, and combinations thereof, wherein the amount of the nickel component is 1.0 to 50 wt. %, calculated as nickel oxide, based on the total weight of the first layer, wherein the amount of ceria component is 20 to 80 wt. %, based on the total weight of the first layer, wherein the amount of the dopant is 1.0 to 20 wt. %, based on the total weight of the ceria component, wherein the amount of the transition metal is 1.0 to 10 wt. %, calculated as the corresponding transition metal oxide, based on the total weight of the first layer and wherein the first layer is essentially free of copper; b) a second layer comprising i) platinum and rhodium, wherein the ratio of palladium or platinum to rhodium is in the range of 100:1 to 1:5, supported on an oxygen storage component and an alumina component, and ii) optionally, at least one alkaline earth metal oxide comprising barium oxide, strontium oxide, or any combination thereof; and c) a substrate, wherein the first or the second layer is deposited as a top layer or bottom layer on a substrate.

An exemplary oxygen storage component includes ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or combinations thereof. In one embodiment, the oxygen storage component comprises ceria-zirconia. In one embodiment, the amount of the oxygen storage component is 20 to 80 wt. %, based on the total weight of the second layer. In one embodiment, the ceria content of the oxygen storage component in the second layer is in the range of 5 to 50 wt. %, based on the total weight of the oxygen storage component. In one embodiment, the ceria component present in the first layer comprises ceria having a specific surface area in the range of 15 m$^2$/g to 60 m$^2$/g after calcination at 950° C. for 12 hours in the air and the amount of ceria component used is 20 to 80 wt. %, based on the total weight of the first layer. In another embodiment, the ceria component of the first layer comprises a dopant. The examples of dopants include, but are not limited to, zirconia, yttria, praseodymia, lanthana, neodymia, samaria, gadolinia, alumina, titania, baria, strontia, and combinations thereof. The dopant is used in an amount of 1.0 to 20 wt. %, based on the total weight of the ceria component.

In one embodiment, the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof. In one embodiment, the amount of the alumina component is in the range of 10 to 80 wt. %, based on the total weight of the second layer.

As used herein, the term "substrate" refers to the monolithic material onto which the catalyst composition is placed, typically in the form of a washcoat containing a plurality of particles containing a catalytic composition thereon.

Reference to "monolithic substrate" or "honeycomb substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

A washcoat is formed by preparing a slurry containing a certain solid content (e.g., 20-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalyst article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

According to one or more embodiments, the substrate of the catalytic article of the presently claimed invention may be constructed of any material typically used for preparing automotive catalysts and typically comprises a ceramic or a metal monolithic honeycomb structure. The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or traces amount of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, alumina, aluminosilicates and the like. Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

In one illustrative embodiment, the first layer is deposited as a bottom layer on the substrate, and the second layer is deposited as a top layer on the bottom layer. (FIG. 1)

In another embodiment, the second layer is deposited as a bottom layer on the substrate, and the first layer is deposited as a top layer on the bottom layer. (FIG. 1)

In another embodiment, the layered catalytic article comprises a) a first layer comprising a nickel component and a ceria component, wherein the amount of the nickel component is 10 to 40 wt. %, calculated as nickel oxide, based on the total weight of the first layer, and wherein the first layer is essentially free of copper; b) a second layer comprising a platinum group metal component, an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first is deposited as a bottom layer on a substrate and the second layer is deposited as a top layer on the first layer.

In another embodiment, the layered catalytic article comprises A a) a first layer comprising a nickel component and a ceria component, wherein the amount of the nickel component is 10 to 40 wt. %, calculated as nickel oxide, based on the total weight of the first layer, and wherein the first layer is essentially free of copper; b) a second layer comprising a platinum group metal component, an oxygen storage component, and an alumina component, wherein the platinum group metal component comprises platinum, rhodium, palladium, or any combination thereof, and wherein the amount of the platinum group metal component is 0.02 to 1.0 wt. %, based on the total weight of the second layer; and c) a substrate, wherein the second layer is deposited as a bottom layer on a substrate and the first layer is deposited as a top layer on the second layer. In one illustrative embodiment, the layered catalytic article comprises a first layer comprising nickel impregnated on a ceria component; and a second layer comprising rhodium impregnated on ceria-zirconia and alumina component, wherein the first layer is deposited on a substrate and the second layer is deposited on the first layer.

In another illustrative embodiment, the layered catalytic article comprises a first layer comprising nickel impregnated on a ceria-zirconia-alumina; and a second layer comprising rhodium impregnated on ceria-zirconia and alumina component, wherein the first layer is deposited on a substrate and the second layer is deposited on the first layer.

In still another illustrative embodiment, the layered catalytic article comprises a first layer comprising nickel impregnated on a ceria-zirconia-alumina; and a second layer comprising palladium impregnated on ceria-zirconia, and rhodium impregnated on alumina component, wherein the first layer is deposited on a substrate and the second layer is deposited on the first layer.

In another embodiment, the layered catalytic article comprises a third layer comprising a platinum group metal component, an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the third layer.

In one embodiment, the layered catalytic article comprises a first layer comprising nickel component, deposited on a substrate, a second layer comprising palladium, deposited on the first layer; and a third layer comprising rhodium, deposited on the second layer.

In one embodiment, the layered catalytic article as described herein above comprises a zonal arrangement. The zonal arrangement consists of a front zone (first zone) and a rear zone (second zone) In one embodiment, the layered catalytic article comprises a) a first layer comprising a nickel component supported on a ceria component, wherein the amount of the nickel component is 10 to 40 wt. %, calculated as nickel oxide, based on the total weight of the first layer, and wherein the first layer is essentially free of copper; b) a second layer comprising a platinum group metal component supported on an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the second layer; and c) a substrate, wherein the first or the second layer is deposited as a top layer or bottom layer on a substrate, wherein at least one of the first layer and second layer comprises a zonal arrangement comprising a first zone and a second zone, wherein said first or second zone covers 45 to 90% of the length of the substrate.

In one embodiment, the first layer comprises a front zone (first zone) or a rear zone (second zone), wherein said front or rear zone covers 45 to 90% of the length of the substrate. In another embodiment, the second layer comprises a front zone (first zone) or a rear zone (second zone), wherein said front or rear zone covers 45 to 90% of the length of the substrate. In yet another embodiment, the third layer comprises a front zone or a rear zone, wherein said front or rear zone covers 45 to 90% of the length of the substrate.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 3A:
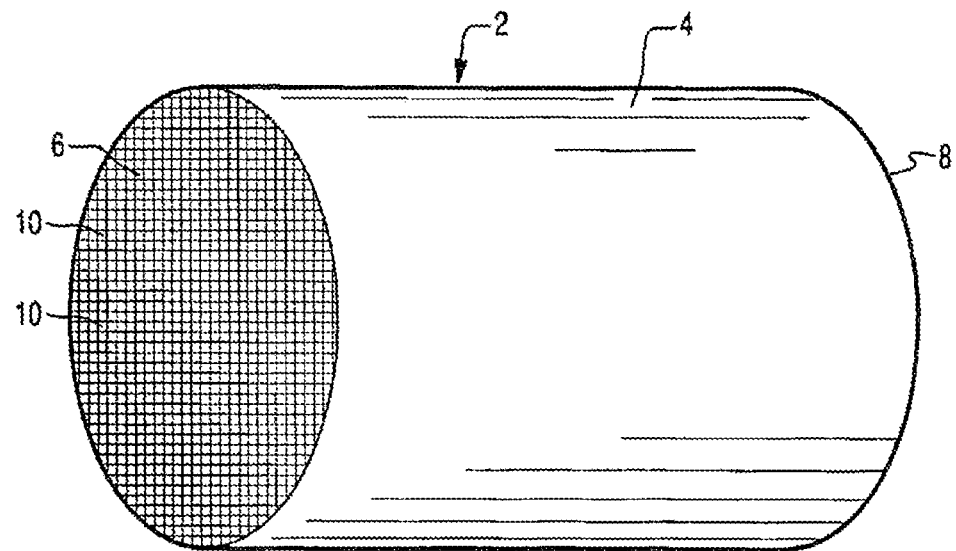
FIG. 3A is a perspective view of a honeycomb-type substrate carrier which may comprises the layered catalyst composition in accordance with one embodiment of the presently claimed invention.
Figure 3B:
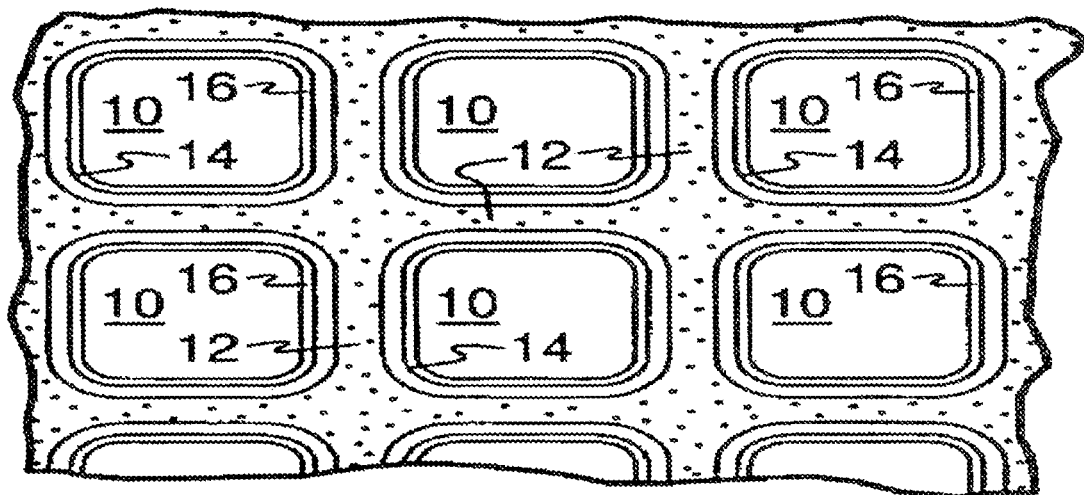
FIG. 3B is a partial cross-section view enlarged relative to FIG. 3A and taken along a plane parallel to the end faces of the substrate carrier of FIG. 3A, which shows an enlarged view of a plurality of the gas flow passages shown in FIG. 3A.

FIGS. 3A and 3B illustrate an exemplary substrate 2 in the form of a flow-through substrate coated with washcoat compositions as described herein. Referring to FIG. 3A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 3B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 3, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

Figure 4:
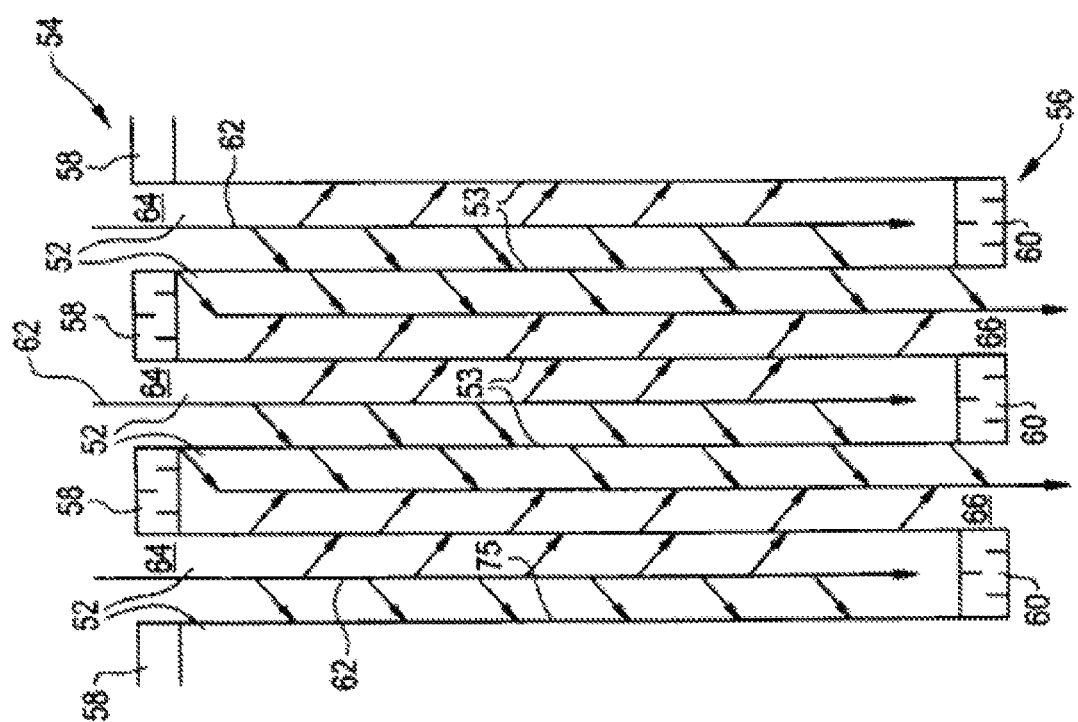
FIG. 4 is a cutaway view of a section enlarged relative to FIG. 3A, wherein the honeycomb-type substrate in FIG. 3A represents a wall flow filter substrate monolith

FIG. 4 illustrates an exemplary substrate 2 in the form of a wall flow filter substrate coated with a washcoat composition as described herein. As seen in FIG. 4, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In accordance with still another aspect, the presently claimed invention provides a process for the preparation of a layered catalytic article. The process includes the following steps:

In the first step, a bottom layer slurry is prepared which is then deposited on a substrate. Separately, a top layer slurry is prepared and deposited on the bottom layer followed by calcination at a temperature ranging from 400 to 700° C. The steps of preparing the bottom layer and the top layer involves a technique such as incipient wetness impregnation, incipient wetness co-impregnation, and post-addition. In one embodiment, the process includes a step of calcination of the substrate coated with the bottom layer before coating with the top layer. Typically, the calcination is carried out at a temperature ranging from 400 to 700° C.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active-metal. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-5 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a $D_{90}$ particle size of about 10 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of from about 850° C. to about 1050° C. in an environment of vol. % water in air for 20 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in air, 20 hours aging).

In another aspect, the presently claimed invention provides an exhaust system for internal combustion engines which comprises a layered catalytic article comprising a layered catalyst composition as described herein above. In one embodiment, the exhaust system comprises a layered catalytic article, comprising a first layer comprising a nickel component and a ceria component, wherein the amount of the nickel component is 1.0 to 50 wt. %, calculated as nickel oxide, based on the total weight of the first layer, and wherein the first layer is essentially free of copper; a second layer comprising a platinum group metal component, an oxygen storage component, and an alumina component, wherein the platinum group metal component comprises platinum, rhodium, palladium, or any combination thereof, and wherein the amount of the platinum group metal component is 0.01 to 5 wt. %, based on the total weight of the second layer; and a substrate.

Figure 2B:
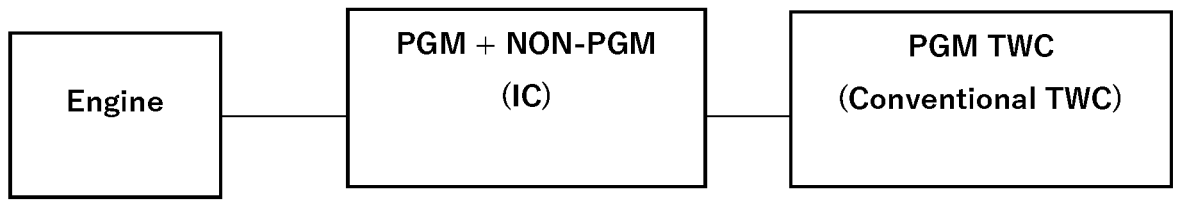
FIG. 2B is a schematic representation of exhaust system in accordance with another embodiment of the presently claimed invention.

In one embodiment, the exhaust system optionally comprises a platinum group metal based three-way conversion (TWC) catalytic article comprising 50 to 300 g/ft³ of a platinum group metal selected from platinum, palladium, rhodium and combinations thereof. FIGS. 2A and 2B illustrate the representative exhaust systems in which the conventional PGM-TWC catalytic article (C-TWC) and the layered catalytic article of the presently claimed invention (PGM+NON PGM, Invention Catalyst-IC) are arranged at different positions with respect to the engine.

In one embodiment, the system comprises a platinum group metal based three-way conversion (TWC) catalytic article and the layered catalytic article described herein above, wherein the platinum group metal based three-way conversion (TWC) catalytic article is positioned downstream from an internal combustion engine and the catalytic article comprising a layered catalyst composition is positioned downstream in fluid communication with the three-way conversion (TWC) catalytic article.

In another embodiment, the system comprises platinum group metal based three-way conversion (TWC) catalytic article and the layered catalytic article described herein above, wherein the layered catalytic article is positioned downstream from an internal combustion engine and the platinum group metal based three-way conversion (TWC) catalytic article is positioned downstream in fluid communication with the three-way conversion (TWC) catalytic article.

Figure 2C:
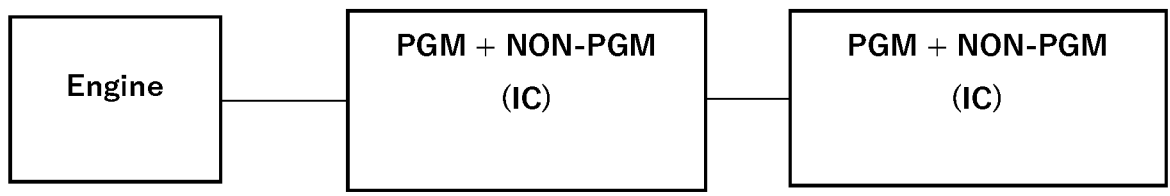
FIG. 2C is a schematic representation of exhaust system in accordance with still another embodiment of the presently claimed invention.

In one embodiment, the platinum group metal based TWC catalytic article is a conventional catalyst. In one exemplary embodiment, a catalytic article disclosed in U.S. Pat. No. 7,758,834 can be used as a TWC catalytic article. The TWC catalytic article is able to simultaneously treat NOx, hydrocarbons and CO from exhaust. The exemplary illustrations of the exhaust systems are provided in FIG. 2.

In another embodiment, the exhaust system for internal combustion engines comprises an exhaust conduit in fluid communication with the internal combustion engine via an exhaust manifold; a TWC catalytic article (CC1) located downstream of the internal combustion engine in the exhaust conduit; and a layered catalytic article (CC2) of the presently claimed invention positioned downstream of the close coupled catalyst in the exhaust conduit.

In one aspect, the presently claimed invention also provides a method of treating a gaseous exhaust stream which comprises hydrocarbons, carbon monoxide, and nitrogen oxide. The method involves contacting the exhaust stream with a catalyst composition or a catalytic article or an exhaust system according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and un-reacted oxygen and/or nitrogen.

Such terms refer as well as to the effluent downstream of one or more other catalyst system components as described herein.

In another aspect, the presently claimed invention also provides a method of reducing hydrocarbons, carbon monoxide, and nitrogen oxide levels in a gaseous exhaust stream. The method involves contacting the gaseous exhaust stream with a catalyst composition or a catalytic article or an exhaust system according to the presently claimed invention to reduce the levels of hydrocarbons, carbon monoxide, and nitrogen oxide in the exhaust gas.

In one aspect, the presently claimed invention also provides use of the catalyst composition or the catalytic article for purifying a gaseous exhaust stream comprising hydrocarbons, carbon monoxide, and nitrogen oxide.

In some embodiment, the catalytic article converts hydrocarbons to carbon dioxide and water. In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article. In some embodiment, the catalytic article converts carbon monoxide to carbon dioxide. In some embodiments, the catalytic article converts at least about 60%, or at least about 70%, or at least about 75%, or at least about 80%, or at least about 90%, or at least about 95% of the amount of carbon monoxide present in the exhaust gas stream prior to contact with the catalytic article. In some embodiment, the catalytic article converts nitrogen oxides to nitrogen.

In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

EXAMPLES

Aspects of the presently claimed invention are more fully illustrated by the following examples, which are set forth to illustrate certain aspects of the present invention and are not to be construed as limiting thereof.

Example 1

Preparation of an Upstream TWC Catalyst 1 (Only PGM, Out of Scope)

An upstream TWC catalyst with a three-layer washcoat architecture was prepared according to Example 1 of U.S. Pat. No. 7,758,834. The catalyst was coated onto a cylinder cordierite monolith substrate having a cell density of 600 cpsi (number of cells per square inch) and a wall thickness of 3 mils (about 100 μm). The total PGM loading was 200 g/ft$^3$ (Pt/Pd/Rh=0/186/14).

Example 2

Preparation of a Downstream Layered Catalyst 2 (PGM+Non-PGM, Invention Catalyst)

A downstream catalyst comprising a non-PGM bottom layer and a PGM top layer with a PGM loading of 1 g/ft$^3$ (Pt/Pd/Rh=0/0/1) was prepared. The catalyst was coated onto a cylinder monolith cordierite substrate having a cell density of 600 cpsi and a wall thickness of 3 mils. Detailed process is provided below:

Preparation of the bottom layer (Non-PGM Layer): A slurry mixture containing about 41.3 wt. % of a high surface area ceria, nickel nitrate to yield 2.2 wt. % of NiO (impregnated onto ceria), 41.3 wt. % of a high surface area lanthana-stabilized zirconia, ferric nitrate to yield 2.2 wt. % of $Fe_2O_3$ (impregnated onto lanthana-stabilized zirconia), 11.0 wt. % of a NiO powder, and zirconium acetate to yield 2.0 wt. % $ZrO_2$ was coated onto the substrate. The washcoat loading of the bottom layer after calcination at 550° C. for 1 hour in air was about 2.30 g/in$^3$.

Preparation of the top layer (PGM Layer): 50 wt. % of the total Rh in the form of rhodium nitrate was impregnated onto a stabilized ceria-zirconia composite, and the remaining 50 wt. % of the total Rh in the form of rhodium nitrate was impregnated onto a refractory γ-$Al_2O_3$. A slurry containing about 32.5 wt. % of a refractory γ-$Al_2O_3$, 32.5 wt. % of a stabilized ceria-zirconia composite with approximately 40 wt. % ceria, 32.5 wt. % of a high surface area lanthana-stabilized zirconia, a colloidal alumina dispersion to yield 2.4 wt. % $Al_2O_3$, and 0.047 wt. % of Rh was coated over the entire bottom layer. The washcoat loading of the top layer after calcination at 550° C. for 1 hour in air was about 1.23 g/in$^3$.

Example 3

Preparation of a Downstream Layered Catalyst 3 (Presence of CuO, Out of Scope)

A downstream catalyst with a PGM loading of 1 g/ft$^3$ (Pt/Pd/Rh=0/0/1) was prepared as per the Catalyst 2, except that 1.0 wt. % CuO in the form of copper nitrate was added to the bottom layer.

Example 4

Preparation of Downstream Layered Catalyst 4 (Only PGM, Out of Scope)

A downstream TWC catalyst with a two-layer washcoat architecture and a PGM loading of 20 g/ft$^3$ (Pt/Pd/Rh=0/16/4) was prepared. The catalyst was coated onto a cylinder monolith cordierite substrate having a cell density of 600 cpsi and a wall thickness of 3 mils. Detailed process is provided below:

Preparation of the bottom layer: 100 wt. % of the total Pd in the form of palladium nitrate was added to a slurry of the bottom coat. The slurry containing about 21.0 wt. % of a refractory γ-$Al_2O_3$, 70.4 wt. % of a stabilized ceria-zirconia composite with approximately 30 wt. % ceria, barium acetate to yield 4.9 wt. % BaO, zirconium acetate to yield 2.4 wt. % $ZrO_2$, lanthanum nitrate to yield 0.9 wt. % $La_2O_3$, and 0.45 wt. % of Pd was coated onto the substrate. The washcoat loading of the bottom layer after calcination at 550° C. for 1 hour in air was about 2.06 g/in$^3$.

Preparation of the top layer: 100 wt. % of the total Rh in the form of rhodium nitrate was impregnated onto a stabilized ceria-zirconia. A slurry containing about 31.2 wt. % of a refractory γ-$Al_2O_3$, 62.4 wt. % of a stabilized ceria-zirconia composite with approximately 10 wt. % ceria, barium acetate to yield 3.1 wt. % BaO, zirconium acetate to yield 3.1 wt. % $ZrO_2$, and 0.14 wt. % of Rh was coated over the entire bottom layer. The washcoat loading of the top layer was about 1.60 g/in$^3$ after calcination at 550° C. for 1 hour in air.

Testing of Catalysts 1-4

The monolith catalysts were individually mounted in steal converter cans and aged in an exhaust line of a gasoline engine under fuel-cut aging cycles. The upstream TWC catalyst (catalyst 1) was aged at a maximum bed temperature of 950° C. for 50 hours. The downstream catalysts (Catalysts 2-4) were aged in at a maximum bed temperature of 940° C. for 50 hours. The aged catalysts were tested on a SULEV (Super Ultralow Emissions Vehicle) equipped with a 1.6 L turbocharged gasoline engine, which was operated under US FTP-75 driving cycles following certified procedures. The emission control systems (Examples 5-7) contained catalyst 1 in a first close-coupled position (CC1) as the universal upstream TWC catalyst, and a downstream catalyst (catalyst 2 or 3 or 4) in a second close-coupled position (CC2). The total amounts of nitrogen oxides, hydrocarbons and carbon monoxide at tailpipe were measured by collecting three bags and the weight averages were calculated. Table 1 provides $NO_x$, THC (total hydrocarbons) and CO tailpipe emissions on FTP-75 tests.

Example 5 contained a conventional upstream TWC (Catalyst 1) and a PGM-non-PGM catalyst at a PGM loading of 1 g/ft$^3$ (Catalyst 2). Example 5 exhibited comparable NOx and THC performances to Example 7 which contained the same conventional upstream TWC (Catalyst 1) and a conventional downstream TWC at a PGM loading of 20 g/ft$^3$ (Catalyst 4). Example 5 displayed a better CO performance than Example 7, attributed to the presence of the NiO component in the bottom layer of Catalyst 2 for the water-gas shift reaction (WGSR). Substantial PGM saving was achieved for Catalyst 2 versus Catalyst 4. Example 6 contained the same conventional upstream TWC (Catalyst 1) and a PGM-non-PGM catalyst with additional 1% CuO in the bottom layer (Catalyst 3). Example 6 underperformed compared to Example 5 and Example 7 in NOx and THC. Analysis of Catalyst 3 revealed that CuO in the bottom layer is migrated to the PGM-containing top layer upon aging. Presumably, the migrated CuO prisoned the PGM function.

TABLE 1

| Example | Upstream Catalyst | Downstream Catalyst | NOx mg/mile | THC mg/mile | CO mg/mile |
| --- | --- | --- | --- | --- | --- |
| Example 5 | Catalyst 1 | Catalyst 2 | 22 | 33 | 140 |
| Example 6 | Catalyst 1 | Catalyst 3 | 30 | 36 | 123 |
| Example 7 | Catalyst 1 | Catalyst 4 | 22 | 31 | 187 |

Example 8

Preparation of a Layered Upstream TWC Catalyst 5 (Only PGM, Out of Scope)

An upstream TWC catalyst with a two-layer washcoat architecture and a PGM loading of 142 g/ft$^3$ (Pt/Pd/Rh=0/137/5) was prepared. The catalyst was coated onto a cylinder monolith cordierite substrate having a cell density of 600 cpsi and a wall thickness of 3 mils. Detailed process is provided below:

Preparation of the bottom layer: 36 wt. % of the total Pd in the form of palladium nitrate was impregnated onto a stabilized ceria-zirconia composite, and 54 wt. % of the total Pd in the form of palladium nitrate was impregnated onto a refractory γ-Al$_2$O$_3$. A slurry containing about 25.3 wt. % of a refractory γ-Al$_2$O$_3$, 63.3 wt. % of a stabilized ceria-zirconia composite with approximately 40 wt. % ceria, barium acetate to yield 6.3 wt. % BaO, a colloidal alumina dispersion to yield 2.1 wt. % Al$_2$O$_3$, and 3.0 wt. % of Pd was coated onto the substrate. The washcoat loading of the bottom layer was about 2.37 g/in$^3$ after calcination at 550° C. for 1 hour in air.

Preparation of the top layer: 10 wt. % of the total Pd in the form of palladium nitrate was impregnated onto a stabilized ceria-zirconia composite, and 100 wt. % of the total Rh in the form of rhodium nitrate was impregnated onto a refractory γ-Al$_2$O$_3$. A slurry mixture containing about 73.5 wt. % of a refractory γ-Al$_2$O$_3$, 21.2 wt. % of a stabilized ceria-zirconia composite with approximately 40 wt. % ceria, neodymium nitrate to yield 1.8 wt. % Nd$_2$O$_3$, a colloidal alumina dispersion to yield 2.6 wt. % Al$_2$O$_3$, 0.58 wt. % of Pd, and 0.21 wt. % of Rh was coated over the entire bottom layer. The washcoat loading of the top layer was about 1.36 g/in$^3$ after calcination at 550° C. for 1 hour in air.

Example 9

Preparation of a Downstream Layered Catalyst 6 (PGM+Non-PGM, Invention Catalyst)

A downstream catalyst comprising a non-PGM bottom layer and a PGM top layer with a PGM loading of 1 g/ft$^3$ (Pt/Pd/Rh=0/0/1) was prepared. The catalyst was coated onto a cylinder monolith cordierite substrate having a cell density of 600 cpsi and a wall thickness of 3 mils. Detailed process is provided below:

Preparation of the bottom layer (Non-PGM Layer): A slurry containing about 60.6 wt. % of a high surface area ceria, 20.2 wt. % of a NiO powder, nickel nitrate to yield 15.2 wt. % of NiO, zirconium acetate to yield 2.0 wt. % ZrO$_2$, and a colloidal alumina dispersion to yield 2.0 wt. % Al$_2$O$_3$ was coated onto the substrate. The washcoat loading of the bottom layer was about 2.97 g/in$^3$ after calcination at 550° C. for 1 hour in air.

Preparation of the top layer (PGM Layer): 50 wt. % of the total Rh in the form of rhodium nitrate was impregnated onto a stabilized ceria-zirconia composite, and the other 50 wt. % of the total Rh in the form of rhodium nitrate was impregnated onto a refractory γ-Al$_2$O$_3$. A slurry containing about 30.8 wt. % of a refractory γ-Al$_2$O$_3$, 61.6 wt. % of a stabilized ceria-zirconia composite with approximately 22 wt. % ceria, zirconium acetate to yield 3.8 wt. % ZrO$_2$, a colloidal alumina dispersion to yield 3.8 wt. % Al$_2$O$_3$, and 0.045 wt. % of Rh was coated over the entire bottom layer. The washcoat loading of the top layer was about 1.30 g/in$^3$ after calcination at 550° C. for 1 hour in air.

Example 10

Preparation of a Downstream Layered TWC Catalyst 7 (Only PGM, Out of Scope)

A downstream TWC catalyst with a two-layer washcoat architecture was prepared. Catalyst 7 has the same formulation as Catalyst 5, except that Catalyst 7 has a PGM loading of 14 g/ft$^3$ (Pt/Pd/Rh=0/12/2).

Testing of Catalysts 5-7

The monolith catalysts were individually mounted in steal converter cans and aged in an exhaust line of a gasoline engine under exothermic aging cycles. The upstream TWC catalyst (Catalyst 5) was aged at a maximum bed temperature of 1050° C. for 100 hours. The downstream catalysts (Catalysts 6 and 7) were aged in at a maximum bed temperature of 950° C. for 100 hours. The aged catalysts were tested on a SULEV vehicle equipped with a 2 L gasoline engine, which was operated under US FTP-75 driving cycles following certified procedures. The emission control systems (Example 11-12) contained Catalyst 5 in a close-coupled position (CC) as the universal upstream TWC catalyst, and a downstream catalyst in an underfloor position (UF). The total amounts of nitrogen oxides, hydrocarbons and carbon monoxide at tailpipe were measured by collecting three bags and the weight averages were calculated. Table 2 provides $NO_x$, THC and CO tailpipe emissions on FTP-75 tests.

Example 11 contained a conventional upstream TWC (Catalyst 5) and a PGM-non-PGM hybrid catalyst at a PGM loading of 1 g/ft$^3$ and a high NiO content (Catalyst 6). Example 11 exhibited a comparable NOx performance to Example 12 which contained the same conventional upstream TWC (Catalyst 5) and a conventional downstream TWC at a PGM loading of 14 g/ft$^3$ (Catalyst 7). Example 11 displayed better THC and CO performances than Example 12.

TABLE 2

| Example | Upstream Catalyst | Downstream Catalyst | NOx mg/mile | THC mg/mile | CO mg/mile |
|---|---|---|---|---|---|
| Example 11 | Catalyst 5 | Catalyst 6 | 11 | 17 | 93 |
| Example 12 | Catalyst 5 | Catalyst 7 | 11 | 22 | 167 |

Example 13

Preparation of an Upstream Layered Catalyst 8 (PGM+Non-PGM, Invention Catalyst)

An upstream catalyst comprising a non-PGM bottom layer and a PGM top layer with a PGM loading of 51 g/ft$^3$ (Pt/Pd/Rh=0/50/1) was prepared. The catalyst was coated onto a cylinder cordierite monolith substrate having a cell density of 600 cpsi and a wall thickness of 3 mils.

Preparation of the bottom layer (Non-PGM Layer): A slurry containing about 60.6 wt. % of a high surface area ceria, 20.2 wt. % of a NiO powder, nickel nitrate to yield 15.2 wt. % of NiO, zirconium acetate to yield 2.0 wt. % $ZrO_2$, and a colloidal alumina dispersion to yield 2.0 wt. % $Al_2O_3$ was coated onto the substrate. The washcoat loading of the bottom layer was about 2.97 g/in$^3$ after calcination at 550° C. for 1 hour in air. Detailed process is provided below:

Preparation of the top layer (PGM Layer): 100 wt. % of the total Pd in the form of palladium nitrate was impregnated onto a stabilized ceria-zirconia composite, and 100 wt. % of the total Rh in the form of rhodium nitrate was impregnated onto a refractory γ-$Al_2O_3$. A slurry containing about 30.1 wt. % of a refractory γ-$Al_2O_3$, 61.2 wt. % of a stabilized ceria-zirconia composite with approximately 22 wt. % ceria, zirconium acetate to yield 3.7 wt. % $ZrO_2$, a colloidal alumina dispersion to yield 3.7 wt. % $Al_2O_3$, 2.2 wt. % of Pd, and 0.044 wt. % of Rh was coated over the entire bottom layer. The washcoat loading of the top layer was about 1.33 g/in$^3$ after calcination at 550° C. for 1 hour in air.

Example 14

Preparation of an Upstream Layered TWC Catalyst 9 (Only PGM, Out of Scope)

An upstream TWC catalyst with a two-layer washcoat architecture was prepared. Catalyst 9 has the same formulation as Catalyst 5, except that Catalyst 9 has a PGM loading of 144 g/ft$^3$ (Pt/Pd/Rh=0/140/4).

Testing of Catalysts 8 and 9

The monolith catalysts were individually mounted in steal converter cans and aged in an exhaust line of a gasoline engine under exothermic aging cycles. The examples were aged at a maximum bed temperature of 1050° C. for 100 hours. The aged catalysts were tested on a PZEV (Partial Zero Emissions Vehicle) vehicle equipped with a 2 L gasoline engine, which was operated under US FTP-75 driving cycles following certified procedures. The emission control systems (Example 13-14) contained a single catalyst in a close-coupled position (CC). The total amounts of nitrogen oxides, hydrocarbons and carbon monoxide at tailpipe were measured by collecting three bags and the weight averages were calculated. Table 3 provides $NO_x$, THC and CO tailpipe emissions on FTP-75 tests.

Compared to a conventional upstream TWC at a PGM loading of 144 g/ft$^3$ (Catalyst 9), the Invention Catalyst at a PGM loading of 51 g/ft$^3$ (Catalyst 8) showed improved NOx and CO reduction. A substantial PGM saving was achieved for Catalyst 8 versus Catalyst 9.

TABLE 3

| Close-coupled Catalyst | PGM Loading g/ft$^3$ | PGM Ratio Pt/Pd/Rh | NOx mg/mile | THC mg/mile | CO mg/mile |
|---|---|---|---|---|---|
| Example 13 (Catalyst 8) | 51 | 0/50/1 | 10 | 41 | 76 |
| Example 14 (Catalyst 9) | 144 | 0/140/4 | 59 | 27 | 242 |

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation

The invention claimed is:

1. A layered catalytic article comprising:
   a) a first layer comprising a nickel component supported on a ceria component, wherein the amount of the nickel component ranges from 1.0 wt. % to 50 wt. %, calculated as nickel oxide, based on the total weight of the first layer, and wherein the first layer is essentially free of copper, wherein the amount of copper is <0.001 wt. %, wherein the ceria component comprises ceria having a specific surface area ranging from 15 m$^2$/g to 60 m$^2$/g after calcination at 950° C. for 12 hours in air, and the amount of the ceria component ranges from 20 wt. % to 80 wt. %, based on the total weight of the first layer;
   b) a second layer comprising a platinum group metal component supported on an oxygen storage component and an alumina component, wherein the platinum group metal component is chosen from a group consisting of platinum, rhodium, palladium, and any combination thereof, and wherein the amount of the platinum group metal component ranges from 0.01 wt. % to 5 wt. %, based on the total weight of the second layer; and
   c) a substrate, wherein the first or the second layer is deposited as a top layer or bottom layer on a substrate.

2. The layered catalytic article according to claim 1, wherein the amount of the nickel component in the first layer ranges from 10 wt. % to 40 wt. %, calculated as nickel oxide, based on the total weight of the first layer.

3. The layered catalytic article according to claim 1, wherein the ceria component of the first layer comprises a dopant chosen from a group consisting of zirconia, yttria, praseodymia, lanthana, neodymia, samaria, gadolinia, alumina, titania, baria, strontia, and combinations thereof, and wherein the amount of the dopant ranges from 1.0 wt. % to 20 wt. %, based on the total weight of the ceria component.

4. The layered catalytic article according to claim 1, wherein the first layer comprises a transition metal chosen from a group consisting of manganese, iron, zinc, and combinations thereof, and wherein the amount of the transition metal ranges from 1.0 wt. % to 10 wt. %, calculated as the corresponding transition metal oxide, based on the total weight of the first layer.

5. The layered catalytic article according to claim 4, wherein the transition metal is iron, and wherein the amount of iron ranges from 1.0 wt. % to 10 wt. %, calculated as iron oxide, based on the total weight of the first layer.

6. The layered catalytic article according to claim 1, wherein the amount of the platinum group metal component in the second layer ranges from 0.02 wt. % to 1.0 wt. %, based on the total weight of the second layer.

7. The layered catalytic article according to claim 1, wherein the platinum group metal component comprises i) 0.02 wt. % to 1 wt. % rhodium, based on the total weight of the second layer, ii) palladium and rhodium, or iii) platinum and rhodium, and wherein the ratio of palladium or platinum to rhodium ranges from 100:1 to 1:5.

8. The layered catalytic article according to claim 1, wherein the oxygen storage component is chosen from a group consisting of ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-neodymia-praseodymia, and any combination thereof, wherein the amount of the oxygen storage component ranges from 20 wt. % to 80 wt. %, based on the total weight of the second layer; and wherein the alumina component is chosen from a group consisting of alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof; wherein the amount of the alumina component ranges from 10 to 80 wt. %, based on the total weight of the second layer.

9. The layered catalytic article according to claim 1, wherein the oxygen storage component comprises ceria content and the ceria content of the oxygen storage component in the second layer ranges from 5 wt. % to 50 wt. %, based on the total weight of the oxygen storage component.

10. The layered catalytic article according to claim 1, wherein the second layer further comprises at least one alkaline-earth metal oxide chosen from a group consisting of barium oxide, strontium oxide, and any combination thereof, and wherein the amount of the alkaline-earth metal oxide ranges from 1 wt. % to 20 wt. %, based on the total weight of the second layer.

11. The layered catalytic article according to claim 1, wherein the first layer is deposited as a bottom layer on the substrate and the second layer is deposited as a top layer on the first layer.

12. The layered catalytic article according to claim 1, wherein the substrate has a flow-through ceramic honeycomb structure, a wall-flow ceramic honeycomb structure, or a metal honeycomb structure.

13. The layered catalytic article according to claim 1, wherein the second layer is deposited as a bottom layer on the substrate and the first layer is deposited as a top layer on the second layer.

14. The layered catalytic article according to claim 1, wherein at least one of the first and the second layer comprises a zonal arrangement comprising a first zone and a second zone, wherein the first or second zone covers from 45% to 90% of the length of the substrate.

15. A process for the preparation of the layered catalytic article according to claim 1, comprising: preparing a bottom layer slurry;
    depositing the bottom layer slurry on a substrate to obtain a bottom layer;
    preparing a top layer slurry; and
    depositing the top layer slurry on the bottom layer to obtain a top layer followed by calcination at a temperature ranging from 400° C. to 700° C.,
    wherein the step of preparing the bottom layer slurry or top layer slurry comprises a technique chosen from a group consisting of incipient wetness impregnation, incipient wetness co-impregnation, and post-addition.

16. An exhaust system for internal combustion engines, comprising: i) the layered catalytic article according to claim 1; and ii) optionally, a platinum group metal based three-way conversion (TWC) catalytic article comprising from 50 g/ft$^3$ to 300 g/ft$^3$ of a platinum group metal chosen from a group consisting of platinum, palladium, rhodium and combinations thereof.

17. The exhaust system according to claim 16, wherein the system comprises a platinum group metal based three-way conversion (TWC) catalytic article and the layered catalytic article, wherein the platinum group metal based three-way conversion (TWC) catalytic article is positioned downstream from an internal combustion engine and the catalytic article is positioned downstream in fluid communication with the platinum group metal based three-way conversion (TWC) catalytic article.

18. The exhaust system according to claim 16, wherein the system comprises a platinum group metal based three-way conversion (TWC) catalytic article and the layered catalytic article, wherein the layered catalytic article is positioned downstream from an internal combustion engine and the platinum group metal based three-way conversion (TWC) catalytic article is positioned downstream in fluid communication with the three-way conversion (TWC) catalytic article.

19. A method of reducing hydrocarbons, carbon monoxide, and nitrogen oxide levels in a gaseous exhaust stream, comprising contacting the gaseous exhaust stream with the layered catalytic article according to claim 1 or an exhaust system according to claim 16 to reduce the levels of hydrocarbons, carbon monoxide, and nitrogen oxide in the exhaust gas.

20. A layered catalytic article comprising:
a) a first layer comprising a nickel component supported on a ceria component, wherein the amount of the nickel component ranges from 1.0 wt. % to 50 wt. %, calculated as nickel oxide, based on the total weight of the first layer, and wherein the first layer is essentially free of copper, wherein the amount of copper is <0.001 wt. %;
b) a second layer comprising a platinum group metal component supported on an oxygen storage component and an alumina component, wherein the platinum group metal component is chosen from a group consisting of platinum, rhodium, palladium, and any combination thereof, and wherein the amount of the platinum group metal component ranges from 0.01 wt. % to 5 wt. %, based on the total weight of the second layer; and
c) a substrate, wherein the first or the second layer is deposited as a top layer or bottom layer on a substrate;
wherein at least one of the first and the second layer comprises a zonal arrangement comprising a first zone and a second zone, wherein the first or second zone covers from 45% to 90% of the length of the substrate.

* * * * *